(12) United States Patent
Martin

(10) Patent No.: US 7,841,182 B2
(45) Date of Patent: Nov. 30, 2010

(54) MICRO-COMBUSTOR FOR GAS TURBINE ENGINE

(75) Inventor: Scott M. Martin, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 826 days.

(21) Appl. No.: 11/497,114

(22) Filed: Aug. 1, 2006

(65) Prior Publication Data
US 2010/0212323 A1 Aug. 26, 2010

(51) Int. Cl.
F02C 1/00 (2006.01)
F02G 3/00 (2006.01)
(52) U.S. Cl. .............................. 60/752; 60/737; 60/746; 138/39
(58) Field of Classification Search ................... 60/737, 60/746, 752; 138/38
See application file for complete search history.

(56) References Cited

U.S. PATENT DOCUMENTS

| | | | | |
|---|---|---|---|---|
| 4,285,193 | A | * | 8/1981 | Shaw et al. .................. 60/777 |
| 4,966,001 | A | * | 10/1990 | Beebe .......................... 60/737 |
| 5,026,273 | A | * | 6/1991 | Cornelison .................. 431/170 |
| 6,082,111 | A | | 7/2000 | Stokes |
| 6,508,056 | B1 | | 1/2003 | Brandon |
| 6,711,889 | B2 | * | 3/2004 | Kuo et al. ................. 60/39.511 |
| 6,711,898 | B2 | | 3/2004 | Laing |
| 6,823,831 | B2 | | 11/2004 | Chu et al. |
| 6,834,504 | B2 | * | 12/2004 | Griffin et al. ................... 60/737 |
| 7,021,562 | B2 | | 4/2006 | Mansour |
| 7,028,483 | B2 | | 4/2006 | Mansour |

OTHER PUBLICATIONS

S. Yuasa, et al, Concept and Combustion Characteristics Of Ultra-Micro Combustors With Premixed Flame, Proceedings of the Combustion Institute 30 (2005), pp. 2455-2462, Published by Elsevier Inc., available online at www.sciencedirect.com.
Anna Lee Y. Tonkovich, et al, The Catalytic Partial Oxidation Of Methane in a Microchannel Chemical Reactor, 11 pages, Published at www.pnl.gov/microcats/aboutus/publications/microchemical/paperlee.pdf.
An Introduction to Combustion, 2nd ed., Stephen Turns, McGraw-Hill International, 2000, pp. 258-259.

* cited by examiner

Primary Examiner—Michael Cuff
Assistant Examiner—Craig Kim

(57) ABSTRACT

An improved gas turbine combustor (20) including a basket (26) and a multiplicity of micro openings (29) arrayed across an inlet wall (27) for passage of a fuel/air mixture for ignition within the combustor. The openings preferably have a diameter on the order of the quenching diameter; i.e. the port diameter for which the flame is self-extinguishing, which is a function of the fuel mixture, temperature and pressure. The basket may have a curved rectangular shape that approximates the shape of the curved rectangular shape of the intake manifolds of the turbine.

11 Claims, 7 Drawing Sheets

MICRO-COMBUSTOR FOR GAS TURBINE ENGINE

STATEMENT OF GOVERNMENT INTEREST

Development for this invention was supported in part by Contract No. DE-FC26-05NT42644, awarded by the United States Department of Energy. Accordingly, the United States Government may have certain rights in this invention.

FIELD OF THE INVENTION

The present invention relates to gas turbines in general, and in particular to an improved micro-combustor for use in such gas turbines.

BACKGROUND OF THE INVENTION

Combustor assemblies are integral components of gas turbine engines. The combustor assembly is positioned in flow communication with a compressor, a fuel injector and one or more turbines. During engine operation, pressurized air from the compressor and fuel from the fuel injector enter the combustor. The resulting fuel/air mixture is ignited to produce a high temperature combustion gas stream. The hot combustion gas then flows downstream to turbines for energy extraction.

As the cost of natural gas and the adverse effects of its emissions increase, there has been a trend to use hydrogen as a fuel in stationary gas turbine engines. The flame speed and flashback tendency of hydrogen are much higher than natural gas fuels, requiring significant changes to the gas turbine combustors. There are two well-known methods to reduce flashback: 1) dilute the fuel/air mixture with gases that do not burn, such as nitrogen or steam; or 2) increase the inlet velocity of the fuel/air mixture above the flame propagation speed. Both of these methods reduce the overall turbine efficiency and have practical limitations.

An example of a gas turbine that reduces undesirable nitrogen oxides ($NO_x$) and carbon monoxide (CO) emissions by providing a more homogeneous fuel/air mixture for main stage combustion is disclosed in U.S. Pat. No. 6,082,111, entitled ANNULAR PREMIX SECTION FOR DRY LOW-$NO_x$ COMBUSTORS. However, the combustors disclosed in that patent will not allow the use of fuels such as hydrogen due to the flashback problem alluded to hereinabove. Flashback occurs when the flame speed of the fuel used is excessive and a flame literally flashes back to the source. This will occur when hydrogen, for example, is used in the conventional nozzle type combustors such as those disclosed in the above-cited patent.

Another example of a combustor is disclosed in a technical paper entitled CONCEPT AND COMBUSTION CHARACTERISTICS OF ULTRA-MICRO COMBUSTORS WITH PREMIXED FLAME, by S. Yuasa, et al, and published in the proceedings of the Combustion Institute 30 (2005) 2455-2462. The micro-combustor disclosed in that paper is designed for use in ultra-micro gas turbines as an application of power micro-electromechanical systems (MEMS) technology. Such micro-combustors are low power laminar flow devices operating at low pressures and low temperatures, and as a result, heat loss and flame stability are significant considerations in the combustor design while flashback is of little concern.

BRIEF DESCRIPTION OF THE DRAWINGS

The invention is explained in the following description in view of the drawings that show.

DETAILED DESCRIPTION OF THE INVENTION

What is needed is a combustor for high power, high temperature, high pressure gas turbines that will reduce $NO_x$ emissions without a loss in power output. The combustor disclosed herein employs a large number of very small fuel/air injectors or inlet openings whose respective diameters are each on the order of the quenching diameter of the fuel employed. The term quenching diameter, as used herein, is the largest cross-sectional opening size (e.g. diameter for a round hole or other corresponding limiting dimension for an opening with a non-round cross-section) that will extinguish a flame propagating through the opening. Quenching diameter is a function of the fuel/air mixture as well as the temperature and pressure conditions. For a flame to propagate through a tube, the rate of energy released by the chemical reaction must be greater than the heat loss to the tube wall. The combustor disclosed herein is less susceptible to flashback than prior art designs, thus facilitating the use of hydrogen as the fuel for the gas turbine engine. In one embodiment the limiting dimension of the openings may be no more than the quenching diameter. In other embodiments the limiting dimension may be no more than twice or thrice the quenching diameter, as examples. While these somewhat larger dimensions are greater than the quenching diameter, a combustor having such dimensions may demonstrate improved protection against flashback events when compared to prior art designs, while at the same time being less expensive to manufacture and offering less flow resistance than when the limiting dimension is no more than the quenching diameter.

Figure 1:
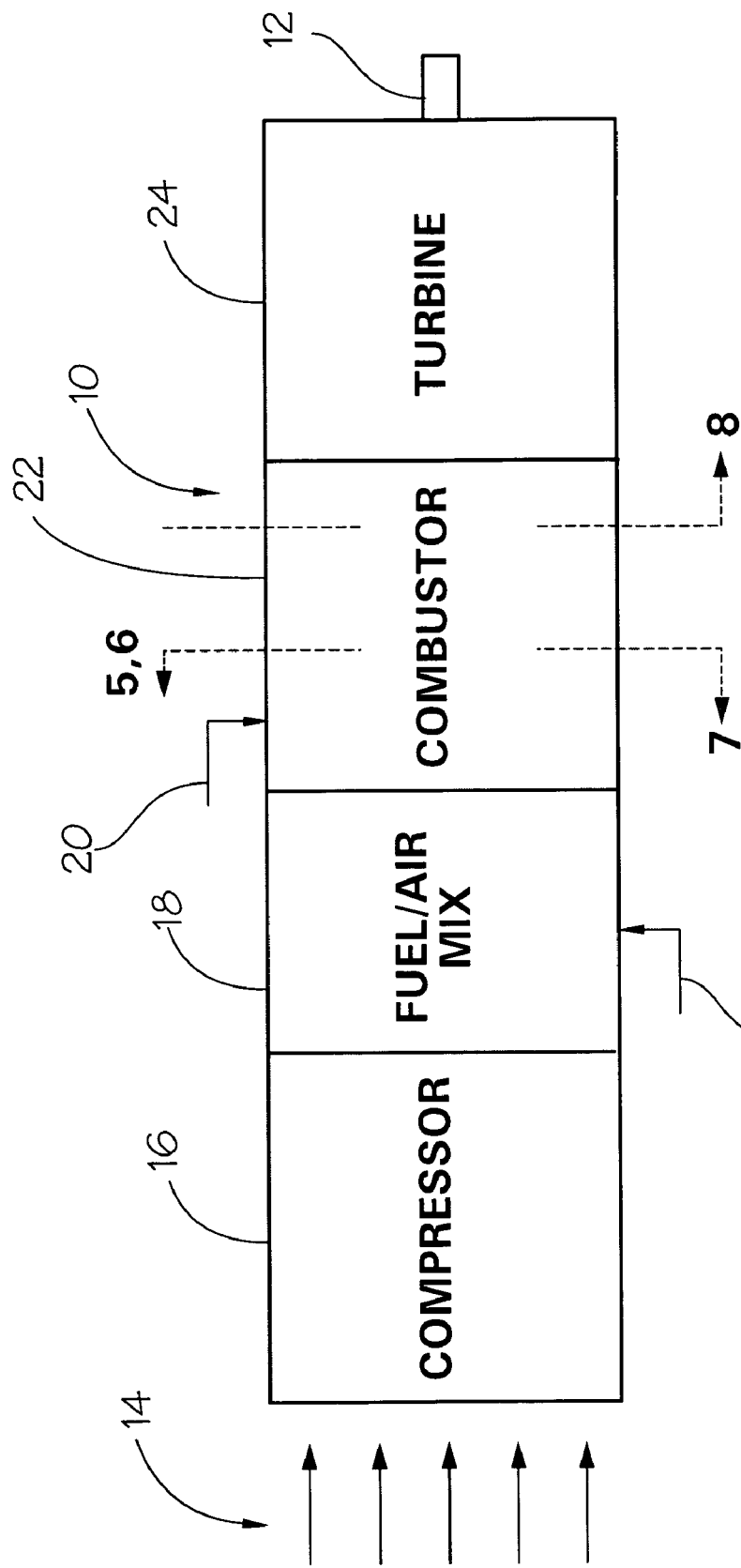
FIG. 1 is a schematic diagram of a typical gas turbine that may employ a micro combustor of the present invention.

Referring now to the drawings and to FIG. 1 in particular, a schematic diagram illustrates a typical gas turbine engine 10 that may employ a micro combustor of the present invention. The turbine 10 is typically cylindrical in cross section and rotates about a central shaft 12. In a conventional well-known manner, when the turbine starts to rotate (e.g., by engagement of an electric starter engine) air is drawn into the engine as denoted by arrows 14 and then compressed by a compressor section 16. Fuel is then injected into a fuel/air mix section 18 by means of fuel lines 20. The compressed air and fuel mixture is then passed on to a combustion section 22, where it is ignited. The combustion gases are then applied to a turbine section 24 for converting the energy of the ignited gases into rotation of the shaft 12 in the conventional well-known manner.

Figure 2:
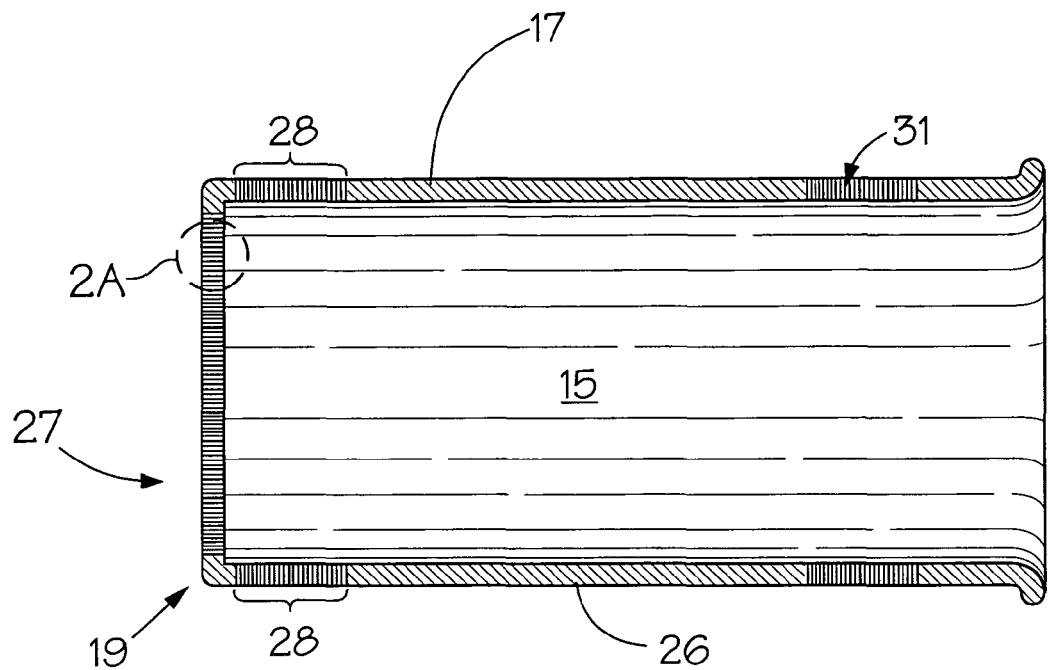
FIG. 2 is a cross-sectional view of a micro combustor basket of the present invention.
Figure 3:
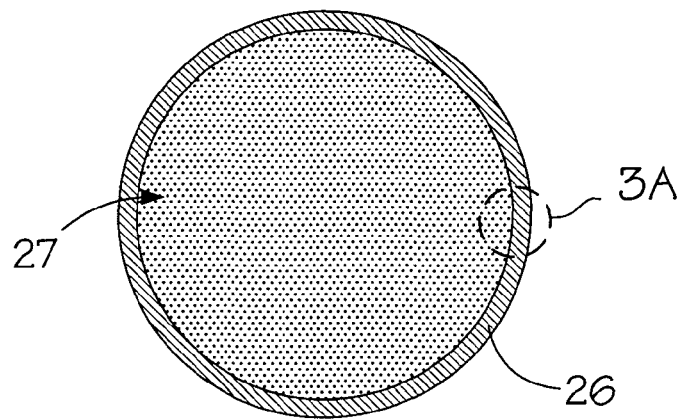
FIG. 3 is an end view of the micro combustor basket shown in FIG. 2.
Figure 3A:
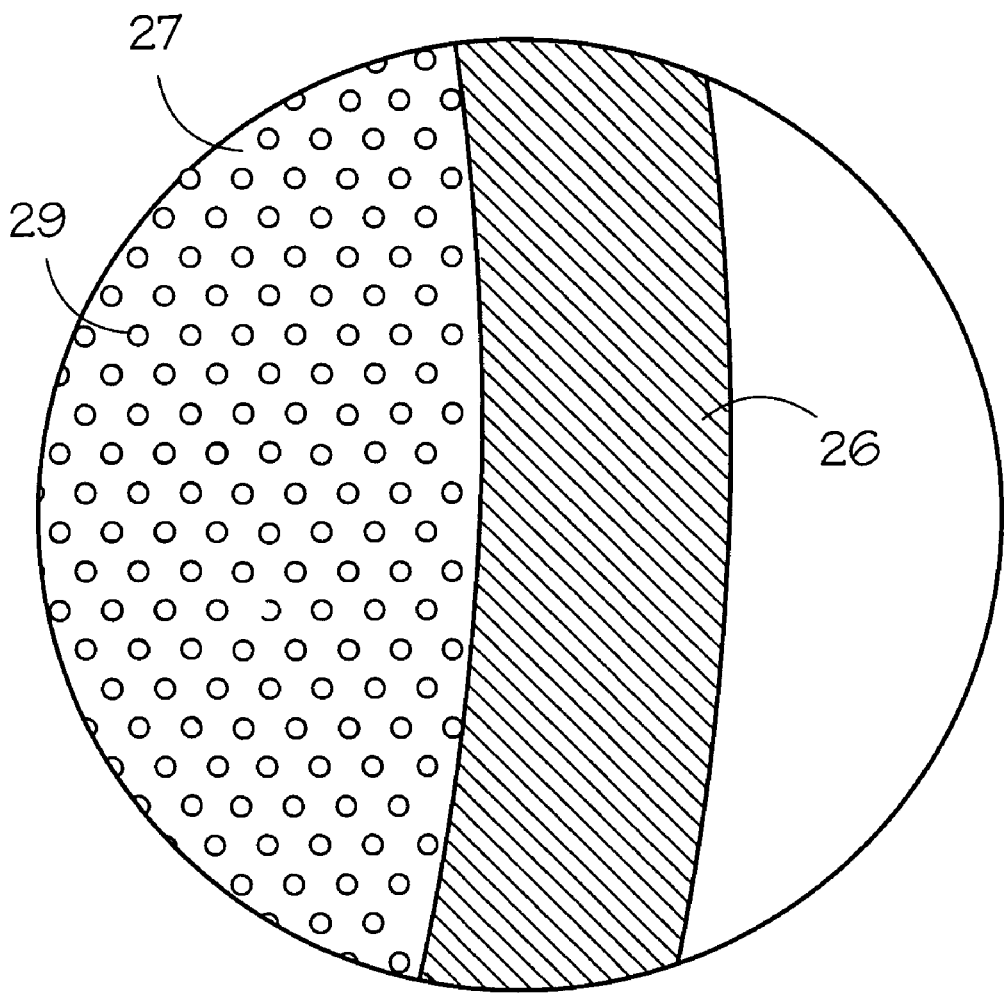
FIG. 3A is an exploded view of a portion of the end wall of the micro-combustor, which view illustrates the array of micro-openings for fuel/air passage.

Referring now to FIGS. 2, 3 and 3A, details of an embodiment of a combustor or combustor basket 26 of the present invention are shown. The basket includes a wall 27 having a plurality of openings 29 formed there through for defining an inlet 19, and a peripheral wall 17 defining a combustion region 15. The inlet wall 27 and optionally a portion 28 of the peripheral wall 17 of the combustor basket include a multiplicity of small openings 29, also referred to herein as nozzles or injectors. A dimension of these openings is determined by the quenching diameter of the fuel/air mixture at gas turbine operating conditions. For a modern gas turbine engine burning a relatively lean mixture of hydrogen fuel (equivalence ratio of less than 1) at high pressure ratios (2-3 MPa) and high combustor inlet temperatures (325-525° C.) and high velocity (on the order of 100 m/sec), the quenching diameter is on the order of 3 mm±2.0 mm. The required fuel/air flow area for a hydrogen-burning combustor of such a typical land-based gas turbine engine used for a power generation application (typically about 20 MW per basket, for example) is about 0.03 $m^2$. To meet these conditions requires about 36 $mm^2$ of total area for each nozzle to allow for spacing between nozzles. This is about half the cross section area of a conventional combustor can or basket, or about half of the area of the inlet wall 27. It should be noted that the small openings 29 may be unevenly distributed across the wall 27. For example, all or a majority of the openings 29 may be formed near the center of the wall 27 so that the outer periphery remains cooler, thereby minimizing heat loss.

There are three mechanisms that work together to prevent flashback through the micro openings 29. First, the fluid velocity through the holes is higher than the flame progression speed. Second, the flame front is quenched within the hole because the radicals created by the oxidation reaction are re-combined by the wall 27 surface (i.e., the surface of the wall 27 acts like a catalyst for recombining the radicals, which prevents them from causing additional reactions). Third, the temperature of the gas is cooled by the surface of the wall 27. Additional small openings 31 may be placed downstream along the circumference of the combustor to allow for axial staging of the fuel.

The small nozzles (i.e., openings 29, 31) may be produced in sections of metal, composites or laminated material. A computer controlled laser may be used to produce the small openings. Each section of nozzles may have small cooling openings, which would introduce air in the absence of fuel and could be supplied via a separate manifold. As stated hereinabove, the fuel and air is mixed in the fuel/air mix section 18 upstream of the combustor 22, which includes a plurality of the micro-combustors 26. As the fuel/air mixture is injected through the small nozzles (i.e., openings 29, 31) it will come into contact with the burning mixture in the combustion region 15 and will combust. The small diameter of the openings 29, 31 will allow the mixture to burn in a very short time. If the flame attempts to propagate upstream into the openings, it will be quenched due to the small diameter of the openings. The overall effect will be to give a very thin, flat flame sitting just downstream from the wall 27. Accordingly, it may be seen from the above that an added benefit of the present invention is that it creates a very short flame and hence very short time to burn the fuel. This short time will reduce the amount of $NO_x$ that is formed. This will allow moving the combustor 22 closer to the turbine inlet. Moreover, since this arrangement creates greater stability of the flame, it may be possible to eliminate the pilot, which is typically employed in prior art gas turbines for stability purposes. It is noted that the small openings should minimize low frequency combustion instability (i.e., flame flicker) and may increase high frequency stability. The multiplicity of small openings may also decrease the chance that the entire flame goes into resonance, since each individual flame will react to local conditions and it may be less likely that the entire system resonates together.

Figure 4A:
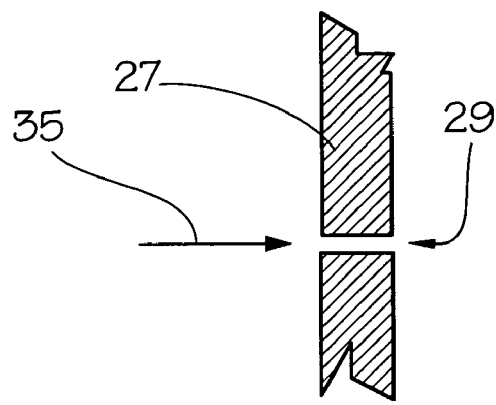
FIGS. 4A through 4D illustrate cross-sectional views of a variety of possible shapes for the micro openings forming jet fuel nozzles for release of the fuel/air mixture for ignition.
Figure 4B:
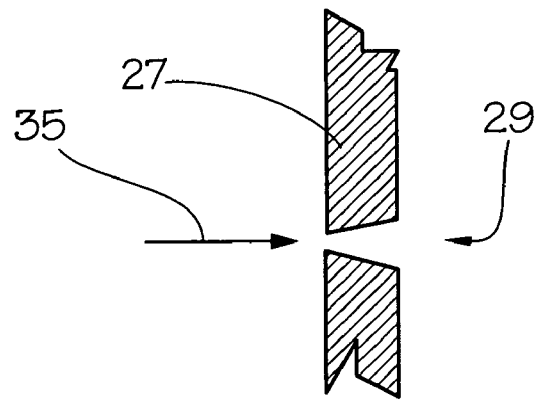
Figure 4C:
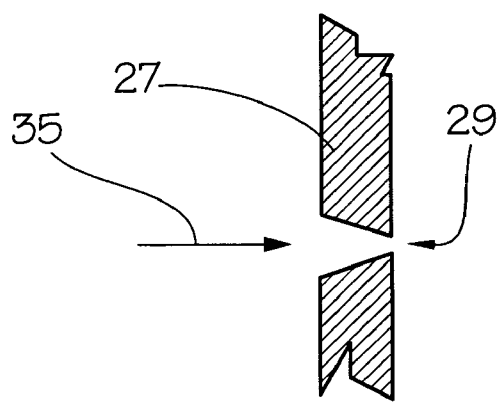
Figure 4D:
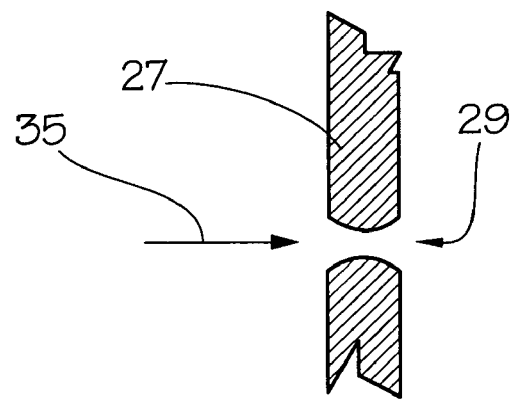

Cross-sectional views of a variety of possible shapes for the micro openings 29 are illustrated in FIGS. 4A through 4D. In accordance with one embodiment for a land-based power generating gas turbine engine, the thickness of the rear wall 27 is approximately 5 to 20 mm, thereby making the nozzles 29 about 5 to 20 mm in axial length. It is noted that openings 31 may be formed into the same shape as those illustrated herein for openings 29. The opening 29 shown in FIG. 4A is the simplest to manufacture. It is a straight through or linear opening and may also have rifling scores in the walls thereof, which would impart a swirling effect on the fuel/air mixture passing there through, which may be desired since the combustion downstream of the openings 29 will be turbulent. FIG. 4B illustrates a slanted wall opening with the wider opening on the side opposite the air flow or leeward side, which would impart less of a pressure drop on the fuel/air mixture passing there through (assuming the flow is from left to right as depicted by arrow 35). FIG. 4C illustrates a slanted opening wall construction opposite to that shown in FIG. 4B, with the wider opening facing into the air flow or windward side. The advantage of using this shape for the openings 29 is that the velocity of the fuel/air mixture is accelerated at the point of combustion (downwind or lee side of the wall 27). Moreover, the smaller diameter at the exit side affords more protection against flashback. FIG. 4D illustrates an opening sloped on both sides of the wall 27, which would produce the lowest pressure drop across the wall 27 of all four of the examples shown.

Figure 5:
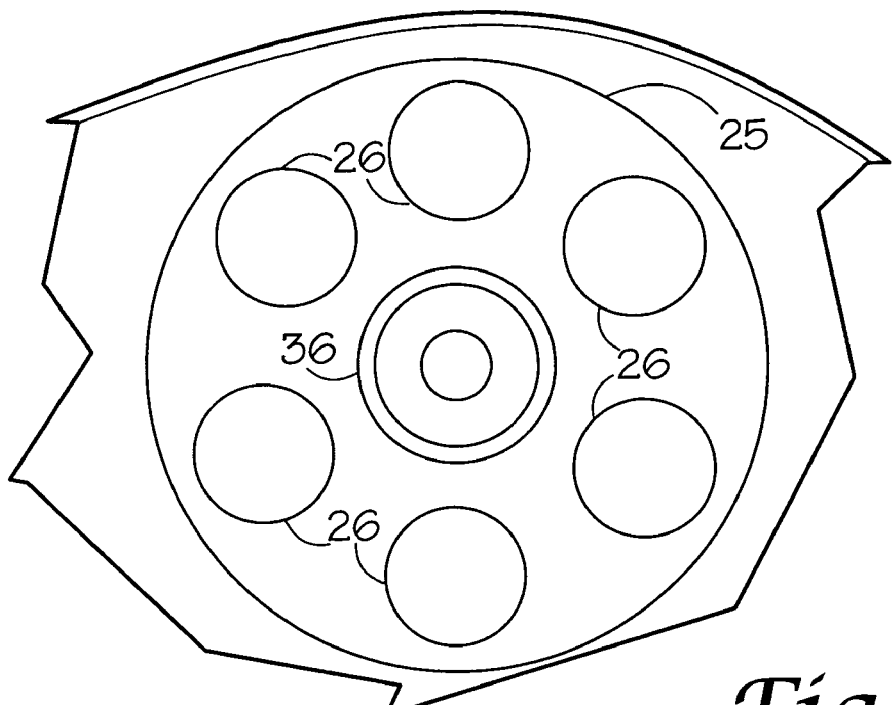
FIG. 5 is a diagram showing use of a micro combustor of the present invention with a conventional pilot light.
Figure 6:
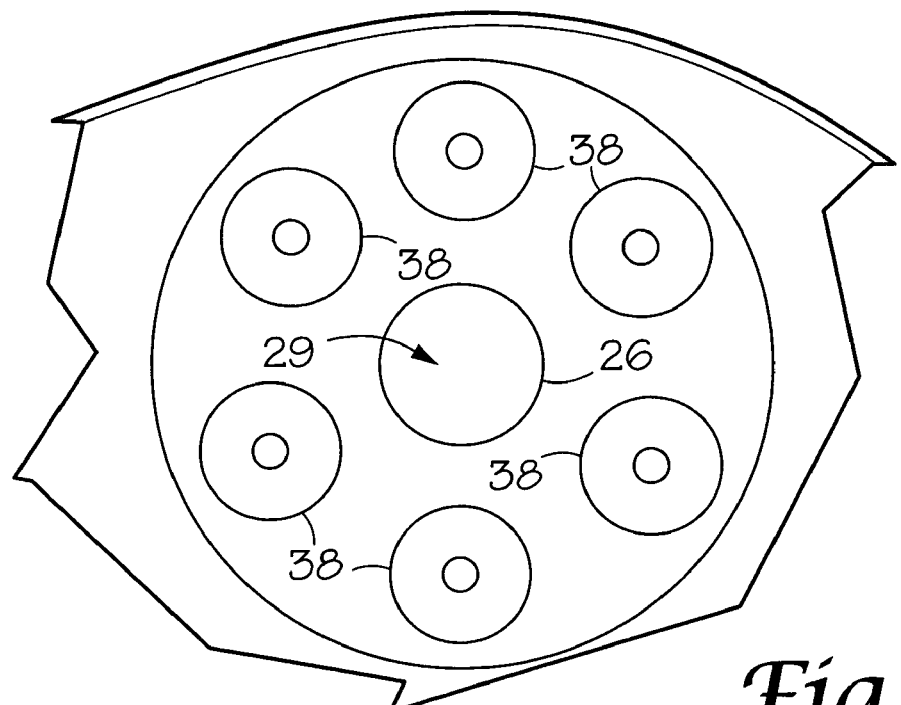
FIG. 6 is a diagram showing use of a micro combustor of the present invention as a pilot light with conventional combustors.

Alternative applications of the micro-combustor of the present invention are illustrated in FIGS. 5 and 6, which are views taken along the section line 5, 6 of FIG. 1. Referring now to FIG. 5, an end view of one of a plurality of combustion baskets 25 is shown wherein a plurality of micro-combustors 26 are disposed annularly about a conventional pilot burner 36 all within the combustion basket 25. Each micro-combustor 26 includes a multiplicity of micro openings 29 as described hereinabove.

FIG. 6 is a diagram showing use of the micro-combustor 26 of the present invention as a pilot burner with conventional pre-mix nozzles 38. This is the reverse arrangement of FIG. 5. Accordingly, it may be appreciated that the micro-combustor 26 disclosed herein may be retrofitted into existing turbine combustors as a replacement for the pre-mix nozzles (FIG. 5) or pilot (FIG. 6) or as a single unit replacing all of the burners in a combustor can/basket.

Figure 8:
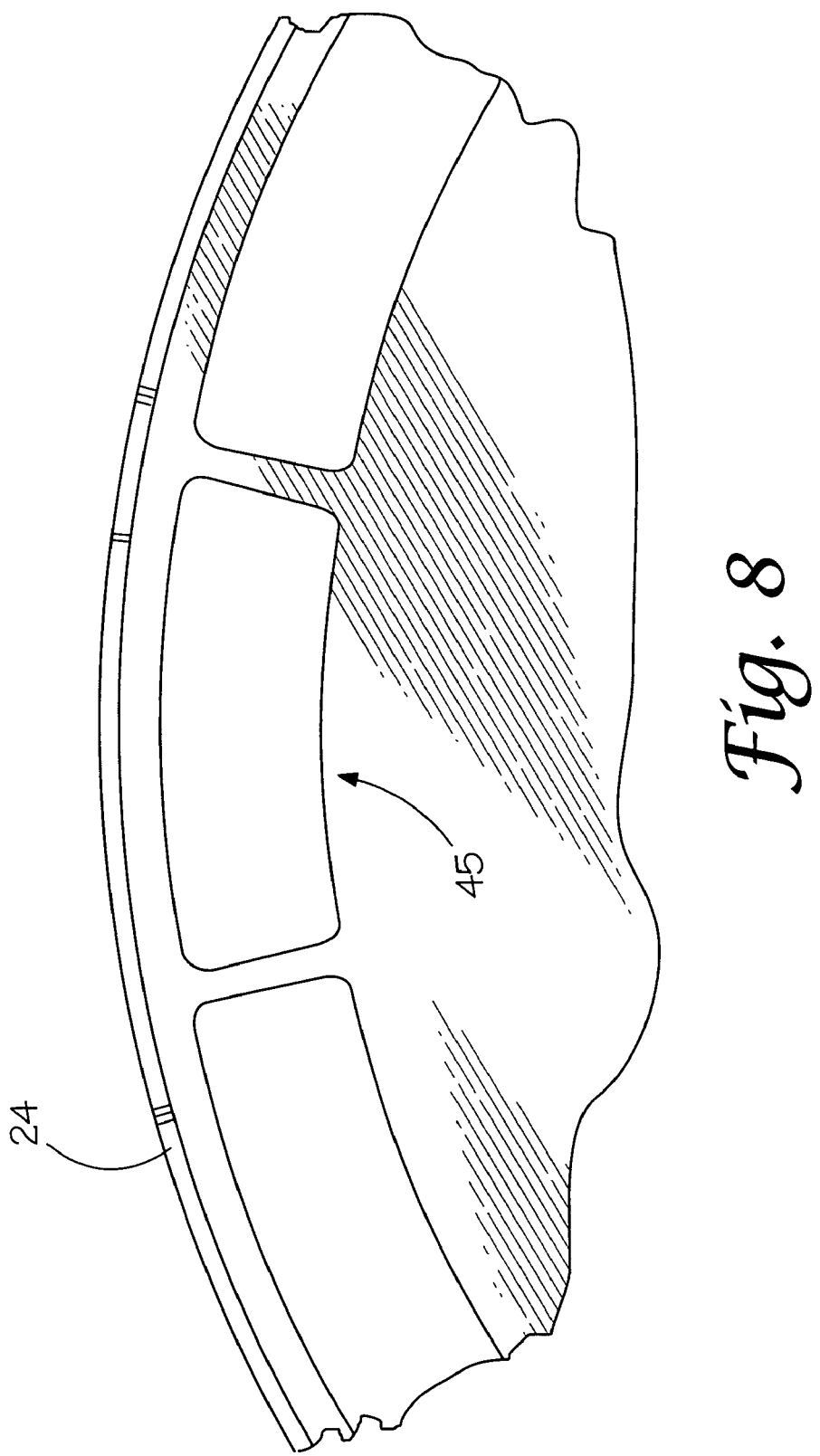
FIG. 8 is a diagram of a portion of a turbine inlet manifold.

As described hereinabove, combustors are typically circular in cross section. However, the inlet to the turbine 24 is rectangular or a curved rectangle (sometimes referred to as a "smiley face" or arch-rectangular) as illustrated in FIG. 8. When using a circular combustor, a transition is required to connect these two different shaped components together. Such a transition increases the complexity and cost of the combustion system. Due to the high temperature of the gases inside the transition, it is often necessary to employ a combination of high temperature thermal coatings and air or steam cooling. The sealing between the combustor and transition is prone to leakage and requires periodic maintenance. The transition also increases the distance the hot gases travel, and hence, increases the time the hot gases spend at high temperatures, which increases the formation of NO$_x$ emissions. By using a combustor that is the same shape as the turbine inlet, a transition is not required and NO$_x$ emissions can be reduced. The combined part can be made of metal, composites or laminated material. Moreover, this will reduce the cost of the total combustion system and the associated failure modes and cooling requirements of the transition.

Current transitions are 30 to 50 cm in length when using conventional fuel injectors. However, this could be reduced to 10 to 20 cm by employing a combustor arrangement of the present invention because the flame length can be greatly reduced, as described hereinabove. Accordingly, the fuel injectors (i.e., openings 29, 31) may be installed even closer to the turbine inlet, further reducing the flame time and hence production of NO$_x$ emissions. The total length of current combustors and transitions is about 100 cm, however by employing the teachings of the micro-combustor of the present invention this can be reduced to as little as 20 cm in one embodiment.

Figure 7:
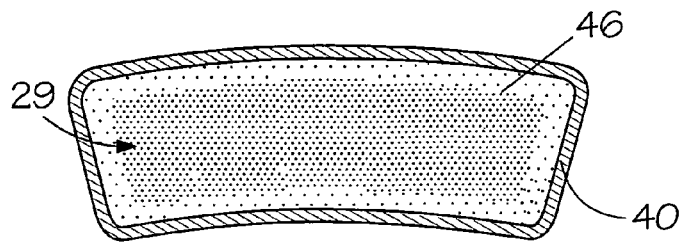
FIG. 7 is a diagram illustrating a possible shape for a micro combustor basket of the present invention that approximates the shape of a conventional turbine inlet.

Referring now to FIG. 7, an alternate shape of a micro combustor basket 40 is shown, which approximates the flow path cross-sectional shape of a conventional turbine inlet 45 as illustrated in FIG. 8. The turbine inlet 45 is one of twelve to sixteen such inlets arranged annularly in a manifold around the outer periphery of the turbine 24. The blades (not shown) of the turbine 24 are directly behind the manifold inlets 45. Accordingly, the combustor 40 and transition sections coupling the combustor to an individual inlet 45 of the gas turbine may be combined into one unit of similar cross sectional shape. The openings 29 are arrayed across the rear (inlet) wall 46 of the combustor 40 as described hereinabove. The constant shape combustor 40 of this embodiment of the invention will combine the functions of the current combustor and transition into a single unit that is smaller and lighter. The openings 29 are illustrated in FIG. 7 as being unevenly arrayed across the inlet wall 46, with a lower concentration of openings being placed near the periphery of the basket 40 in order to reduce the heat transfer through the basket peripheral wall.

Figure 7A:
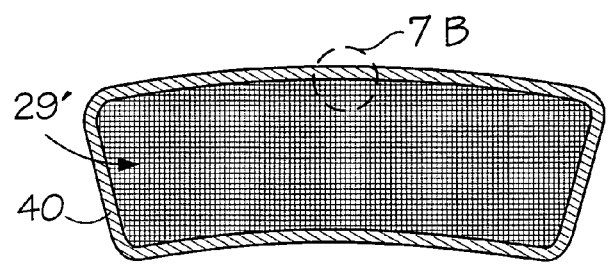
FIG. 7A is a diagram of the same micro-combustor basket shown in FIG. 7, but with an alternate embodiment of a wire mesh forming the micro-openings.
Figure 7B:
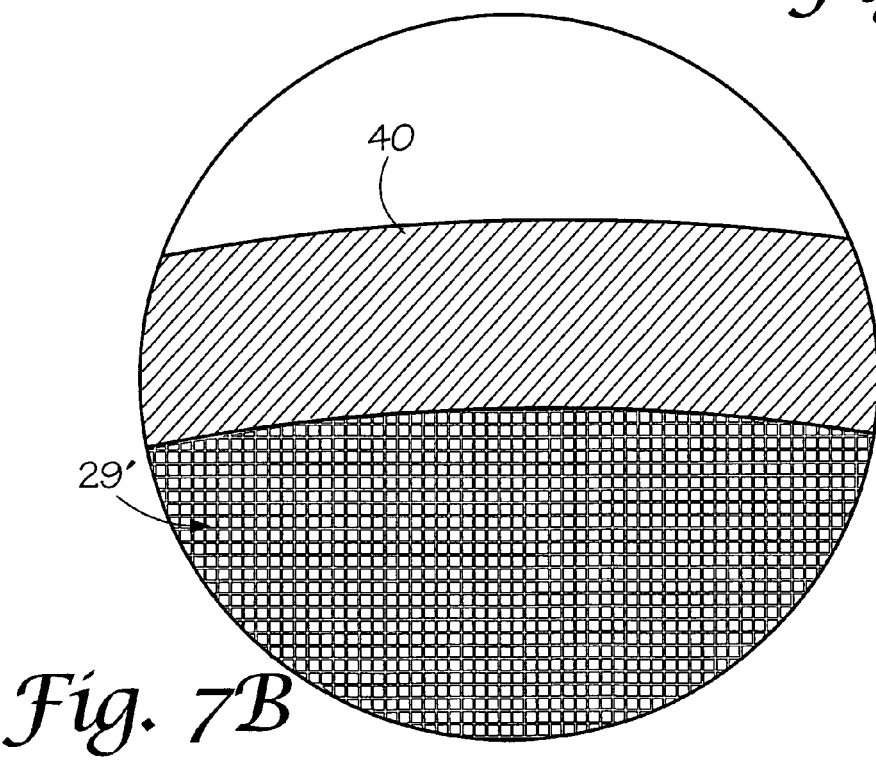
FIG. 7B is an exploded view of a portion of the wire mesh embodiment illustrated in FIG. 7A.

In another embodiment of the present invention, as illustrated in FIGS. 7A and 7B, a wire mesh 29' is employed in lieu of a rear wall 27. The mesh 29' defines a multiplicity of openings 29 between parallel wires of the mesh. The wire mesh 29' would be selected so that the spacing between the parallel wires is no greater than the quenching diameter for the fuel/air mixture being used in the turbine engine, or no greater than twice or thrice the quenching diameter. The flow passage defined between the wires of such a wire mesh may provide a cross-sectional flow geometry similar to that illustrated in FIG. 4D.

It is to be noted that the combustor disclosed herein is not limited to land-based turbines. For example, the combustor of this invention may be employed in jet engines for airplanes or in any other embodiment ranging from 1 KW per can or higher, for example. If a fuel other than hydrogen is to be used, such as natural or synthetic gases, the micro-openings 29 or 29' may be increased in size by an appropriate factor, such as by a factor of 2 or greater.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine combustor comprising:
   a basket comprising a peripheral wall and an inlet surface, defining a combustion region therein; and
   a multiplicity of inlet openings arrayed through the inlet surface for passage of a fuel/air mixture for ignition within the combustion region;
   wherein each of the inlet openings comprises an inlet opening dimension of 1 mm to 15 mm, and an inlet length of 5 mm to 20 mm.

2. The combustor as in claim 1 further comprising a multiplicity of peripheral openings each comprising a peripheral opening dimension of 1 mm to 15 mm arranged through the peripheral wall for axial staging of a portion of the fuel/air mixture.

3. The combustor as in claim 1 wherein said inlet openings comprise holes of 3 mm±2.0 mm diameter.

4. The combustor as in claim 1 wherein the inlet surface comprises wire mesh having inlet openings between parallel wires.

5. The combustor as in claim 1, wherein the inlet surface comprises a shape corresponding to a shape of a turbine inlet in fluid communication with the combustor.

6. The combustor as in claim 1, wherein the inlet openings are unevenly arrayed across the inlet surface such that there is greater flow volume near a center of the inlet surface than near a radial edge.

7. The combustor as in claim 1, wherein at least one of the openings comprises a varying diameter along an axial length of the respective opening.

8. The combustor as in claim 1, wherein each of the openings comprises a dimension no greater than 10 mm.

9. The combustor as in claim 1, wherein each of the openings comprises a dimension no greater than 5 mm.

10. A gas turbine engine comprising the combustor of claim 1.

11. The combustor as in claim 1 wherein the inlet openings comprise rifling scores effective to impart a swirling effect on the fuel/air mixture flowing therethrough.

* * * * *